United States Patent
Yamagishi (10) Patent No.: US 7,379,257 B2
(45) Date of Patent: May 27, 2008

(54) MAGNETIC DISK DRIVE

(75) Inventor: Michinaga Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/225,902

(22) Filed: Sep. 14, 2005

(65) Prior Publication Data

US 2006/0061899 A1 Mar. 23, 2006

Related U.S. Application Data

(63) Continuation of application No. PCT/JP03/03176, filed on Mar. 17, 2003.

(51) Int. Cl.
*G11B 15/12* (2006.01)
*G11B 5/00* (2006.01)
*G11B 5/596* (2006.01)
*G11B 5/48* (2006.01)

(52) U.S. Cl. .................. 360/63; 360/76; 360/78.04; 360/78.12; 360/246.6; 360/236.1; 360/236.3

(58) Field of Classification Search ................. None
See application file for complete search history.

(56) References Cited

U.S. PATENT DOCUMENTS 4,334,252 A * 6/1982 Toriu .................. 360/234
5,010,430 A * 4/1991 Yamada et al. ........... 360/235.4
6,021,024 A * 2/2000 Akiyama et al. .......... 360/236.8

FOREIGN PATENT DOCUMENTS

| JP | 60-70508 | 4/1985 |
| JP | 62-6423 | 1/1987 |
| JP | 3-254411 | 11/1991 |
| JP | 4-58806 | 5/1992 |
| JP | 4-186508 | 7/1992 |
| JP | 5-342526 | 12/1993 |
| JP | 11-16138 | 1/1999 |
| JP | 11-167703 | 6/1999 |

* cited by examiner

*Primary Examiner*—Andrew L. Sniezek
(74) *Attorney, Agent, or Firm*—Kratz, Quintos & Hanson, LLP

(57) ABSTRACT

A magnetic disk drive includes an actuator arm, a suspension fixed to a tip end of the actuator arm, and a head slider having at least two electromagnetic transducers mounted at a tip end of the suspension. The head slider has a first electromagnetic transducer inclined in a direction in which the inner side face side is nearer to an air outflow end than a central portion thereof, and a second electromagnetic transducer inclined in a direction in which the outer side face side is nearer to the air outflow side than the central portion thereof. A controller performs changeover control such that an inner side data region of a magnetic disk is taken charge of by the first electromagnetic transducer while an outer side data region is taken charge of by the second electromagnetic transducer.

20 Claims, 12 Drawing Sheets

MAGNETIC DISK DRIVE

This is a continuation of PCT International Application NO. PCT/JP03/03176, filed Mar. 17, 2003, which was not published in English.

BACKGROUND OF THE INVENTION

1. Field of the Invention

The present invention relates to a magnetic disk drive for vertical recording.

2. Description of the Related Art

In recent years, together with the progress of downsizing and increase in capacity of magnetic disk drive, refinement of magnetic particles in a medium is demanded. However, according to a conventional recording method which is called in-plane recording method, since refinement of magnetic particles makes a factor of thermal instability, it is difficult to produce very fine magnetic particles. Therefore, a vertical magnetic recording method which is superior in thermomagnetic relaxation and so forth is examined. In a common vertical magnetic recording method, a two-layer film medium is used which is formed by laminating a soft magnetic ground layer on a substrate and laminating a vertical magnetization film on the soft magnetic ground layer.

Figure 1:
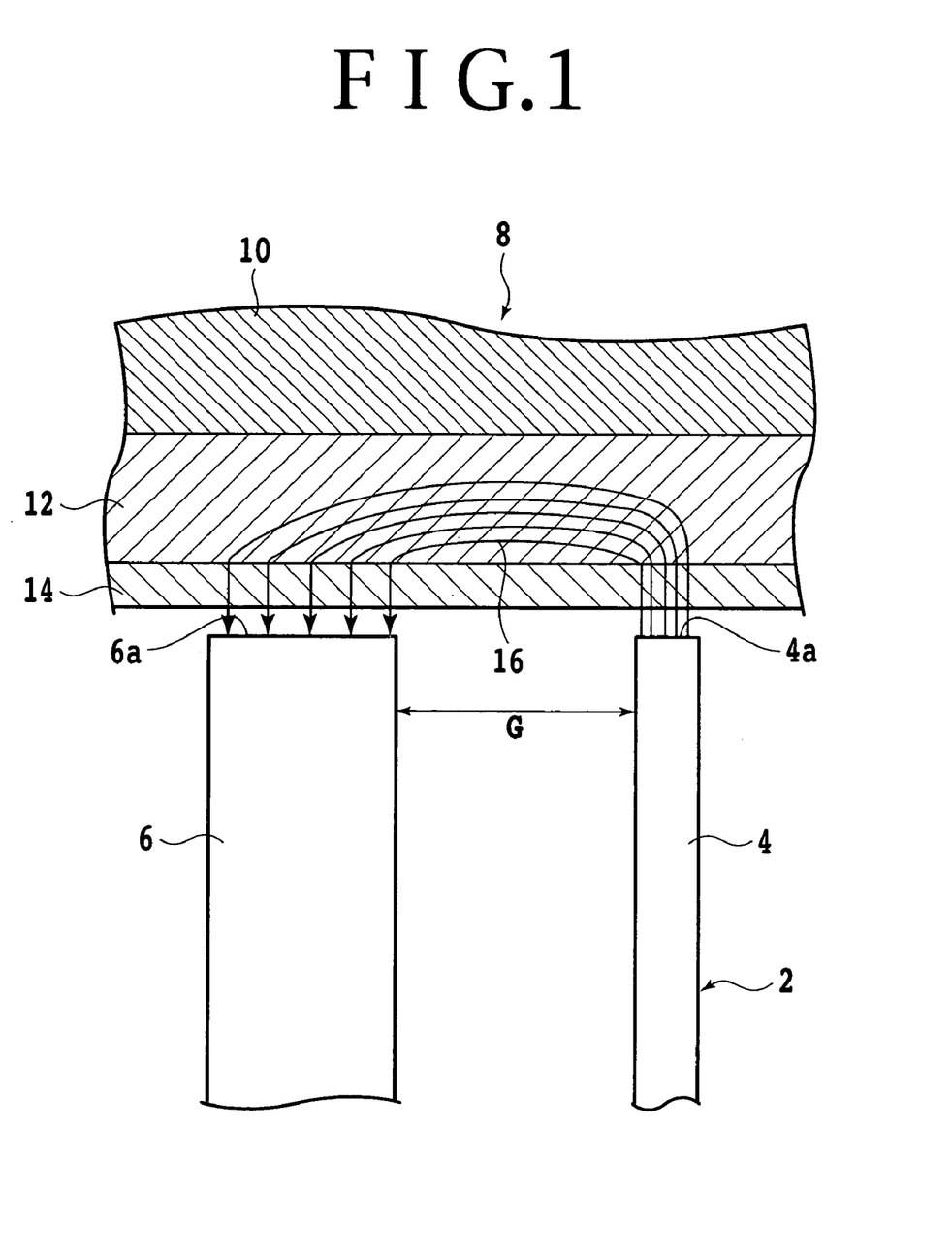
FIG. 1 is a view illustrating a relationship between magnetic fluxes from a vertical recording magnetic head and a vertical magnetic recording medium.

Referring to FIG. 1, there is illustrated a relationship between a conventional vertical recording magnetic head 2 and a vertical magnetic recording medium 8. The vertical magnetic recording medium 8 is formed by laminating a soft magnetic ground layer 12 of Ni—Fe or the like on a non-magnetic substrate 10 and laminating a vertical magnetization film 14 made of Co—Cr on the soft magnetic ground layer 12. The soft magnetic ground film 12 has a thickness of 1 µm or more, and the vertical magnetization film 14 has a thickness of 0.1 µm or less.

The vertical recording magnetic head 2 includes a leading pole 4 and a trailing pole 6, and most part of magnetic fluxes 16 outgoing from a tip end 4a of the leading pole 4 of the magnetic head 2 pass through the soft magnetic ground film 12 and return to the trailing pole 6. In this manner, in the vertical magnetic recording medium 8, since most part of the magnetic fluxes 16 pass through the soft magnetic ground film 12 having a great thickness and return to the trailing pole 6, a magnetic field in a steep vertical direction can be easily applied to the vertical magnetization film 14. Therefore, the gap length G to be defined between the tip end 4a of the leading pole 4 and a tip end 6a of the trailing pole 6 need not be set very short. Generally, the gap length G is set to a great gap length of approximately 10 µm. Generally, since the shape of the tip end 4a of the leading pole 4 and the tip end 6a of the trailing pole 6 is a rectangular shape, the magnetic fluxes 16 of a rectangular shape are applied to the vertical magnetic recording medium 8.

A conventional magnetic disk drive for which a vertical recording method is used has such problems as described below. When a head slider performs seeking movement to the inner or outer side of a magnetic disk, since the air bearing surface (ABS) shape or flotation face shape of the head slider is a rectangular shape, a yaw angle dependence occurs together with the rectangular shape of fluxes to be applied as described above. Then, upon data recording, data to be recorded is recorded protruding to a one-side track edge, and then upon reproduction, the reproduction signal quality is degraded by an influence of the protruding recorded portion. Conventionally, the flotation face shape of the head slider is set to an inverse trapezoidal shape or a rectangular shape having a taper on the upper side to decrease the protruding portion of the magnetic fluxes upon recording on the inner or outer side. However, it is very difficult from a viewpoint of a fabrication process to work the head slider into such a special shape as described above. Further, also the yield is low, and a considerable expense is required from a viewpoint of the cost.

SUMMARY OF THE INVENTION

It is therefore an object of the present invention to provide a vertical recording magnetic disk drive which can suppresses the yaw angle dependence upon recording.

According to an aspect of the invention, there is provided a magnetic disk drive including a housing having a base, an actuator arm mounted for pivotal motion on the base, a suspension having a base end fixed to a tip end of the actuator arm, a head slider having at least two electromagnetic transducers mounted at a tip end of the suspension, a magnetic disk accommodated for rotation in the housing, and a controlling section for performing changeover control between the at least two electromagnetic transducers. The head slider has an air inflow end, an air outflow end, an inner side face, an outer side face, a first electromagnetic transducer inclined in a direction in which the inner side face side is nearer to the air outflow end than a central portion thereof, and a second electromagnetic transducer inclined in a direction in which the outer side face side is nearer to the air outflow side than the central portion thereof. The controlling section performs the changeover control such that a data region of the magnetic disk is virtually divided at a central portion thereof into two regions and the inner side data region is taken charge of by the first electromagnetic transducer while the outer side data region is taken charge of by the second electromagnetic transducer.

Preferably, where the maximum yaw angle of the head slider is represented by $\theta_{max}$, an angle defined by a straight line interconnecting the center of pivotal motion of the actuator arm and the center of the first electromagnetic transducer and a longitudinal center line of the head slider by $\phi_i$, and an angle defined by a straight line interconnecting the center of pivotal motion of the actuator arm and the center of the second electromagnetic transducer and the longitudinal center line of the head slider by $\phi_o$, the first electromagnetic transducer is inclined by $\theta_{max}/4-\phi_i$ with respect to a perpendicular line to the straight line interconnecting the center of pivotal motion of the actuator arm and the center of the first electromagnetic transducer, and the second electromagnetic transducer is inclined by $\theta_{max}/4-\phi_o$ with respect to a perpendicular line to the straight line interconnecting the center of pivotal motion of the actuator arm and the center of the second electromagnetic transducer.

Preferably, the first and second electromagnetic transducers are provided in the proximity of the air outflow end. As an alternative, the first and second electromagnetic transducers may be provided in the proximity of the air inflow end.

According to another aspect of the invention, there is provided a magnetic disk drive including a housing having a base, an actuator arm mounted for pivotal motion on the base, a suspension having a base end fixed to a tip end of the actuator arm, a head slider having at least two electromagnetic transducers mounted at a tip end of the suspension, a magnetic disk accommodated for rotation in the housing, and a controlling section for performing changeover control between the at least two electromagnetic transducers. The head slider has an air inflow end, an air outflow end, an inner side face, an outer side face, a first electromagnetic transducer inclined in a direction in which the inner side face side is farther from the air outflow end than a central portion thereof, and a second electromagnetic transducer inclined in a direction in which the outer side face side is farther from the air outflow side than the central portion thereof. The controlling section performs the changeover control such that a data region of the magnetic disk is virtually divided at a central portion thereof into two regions and the inner side data region is taken charge of by the second electromagnetic transducer while the outer side data region is taken charge of by the first electromagnetic transducer.

Preferably, where the maximum yaw angle of the head slider is represented by $\theta_{max}$, an angle defined by a straight line interconnecting the center of pivotal motion of the actuator arm and the center of the first electromagnetic transducer and a longitudinal center line of the head slider by $\phi_i$, and an angle defined by a straight line interconnecting the center of pivotal motion of the actuator arm and the center of the second electromagnetic transducer and the longitudinal center line of the head slider by $\phi_o$, the first electromagnetic transducer is inclined by $\theta_{max}/4+\phi_i$ with respect to a perpendicular line to the straight line interconnecting the center of pivotal motion of the actuator arm and the center of the first electromagnetic transducer, and the second electromagnetic transducer is inclined by $\theta_{max}/4+\phi_o$ with respect to a perpendicular line to the straight line interconnecting the center of pivotal motion of the actuator arm and the center of the second electromagnetic transducer.

Preferably, the first and second electromagnetic transducers are provided in the proximity of the air outflow end. As an alternative, the first and second electromagnetic transducers may be provided in the proximity of the air inflow end.

According to a further aspect of the invention, there is provided a magnetic disk drive including a housing having a base, an actuator arm mounted for pivotal motion on the base, a suspension having a base end fixed to a tip end of the actuator arm, a head slider having at least three electromagnetic transducers mounted at a tip end of the suspension, a magnetic disk accommodated for rotation in the housing, and a controlling section for performing changeover control among the at least three electromagnetic transducers. The head slider has an air inflow end, an air outflow end, an inner side face, an outer side face, a first electromagnetic transducer inclined in a direction in which the inner side face side is nearer to the air outflow end than a central portion thereof, a second electromagnetic transducer inclined in a direction in which the outer side face side is nearer to the air outflow side than the central portion thereof, and a third electromagnetic transducer provided in the proximity of the air outflow end. The controlling section performs the changeover control such that a data region is virtually divided into three regions and the inner side data region is taken charge of by the first electromagnetic transducer while the outer side data region is taken charge of by the second electromagnetic transducer and the central data region is taken charge of by the third electromagnetic transducer.

Preferably, where the maximum yaw angle of the head slider is represented by $\theta_{max}$, an angle defined by a straight line interconnecting the center of pivotal motion of the actuator arm and the center of the first electromagnetic transducer and a longitudinal center line of the head slider by $\phi_i$, and an angle defined by a straight line interconnecting the center of pivotal motion of the actuator arm and the center of the second electromagnetic transducer and the longitudinal center line of the head slider by $\phi_o$, the first electromagnetic transducer is inclined by $\theta_{max}/6-\phi_i$ with respect to a perpendicular line to the straight line interconnecting the center of pivotal motion of the actuator arm and the center of the first electromagnetic transducer, and the second electromagnetic transducer is inclined by $\theta_{max}/6-\phi_o$ with respect to a perpendicular line to the straight line interconnecting the center of pivotal motion of the actuator arm and the center of the second electromagnetic transducer.

Preferably, the first and second electromagnetic transducers are provided in the proximity of the air outflow end. As an alternative, the first and second electromagnetic transducers may be provided in the proximity of the air inflow end.

According to a still further aspect of the invention, there is provided a magnetic disk drive including a housing having a base, an actuator arm mounted for pivotal motion on the base, a suspension having a base end fixed to a tip end of the actuator arm, a head slider having at least three electromagnetic transducers mounted at a tip end of the suspension, a magnetic disk accommodated for rotation in the housing, and a controlling section for performing changeover control among the at least three electromagnetic transducers. The head slider has an air inflow end, an air outflow end, an inner side face, an outer side face, a first electromagnetic transducer inclined in a direction in which the inner side face side is farther from the air outflow end than a central portion thereof, a second electromagnetic transducer inclined in a direction in which the outer side face side is farther from the air outflow side than the central portion thereof, and a third electromagnetic transducer provided in the proximity of the air outflow end. The controlling section performs the changeover control such that a data region is virtually divided into three regions and the inner side data region is taken charge of by the second electromagnetic transducer while the outer side data region is taken charge of by the first electromagnetic transducer and the central data region is taken charge of by the third electromagnetic transducer.

Preferably, the maximum yaw angle of the head slider is represented by $\theta_{max}$, an angle defined by a straight line interconnecting the center of pivotal motion of the actuator arm and the center of the first electromagnetic transducer and a longitudinal center line of the head slider by $\phi_i$, and an angle defined by a straight line interconnecting the center of pivotal motion of the actuator arm and the center of the second electromagnetic transducer and the longitudinal center line of the head slider by $\phi_o$, the first electromagnetic transducer is inclined by $\theta_{max}/6+\phi_i$ with respect to a perpendicular line to the straight line interconnecting the center of pivotal motion of the actuator arm and the center of the first electromagnetic transducer, and the second electromagnetic transducer is inclined by $\theta_{max}/6+\phi_o$ with respect to a perpendicular line to the straight line interconnecting the center of pivotal motion of the actuator arm and the center of the second electromagnetic transducer.

Preferably, the first and second electromagnetic transducers are provided in the proximity of the air outflow end. As an alternative, the first and second electromagnetic transducers may be provided in the proximity of the air inflow end.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 2:
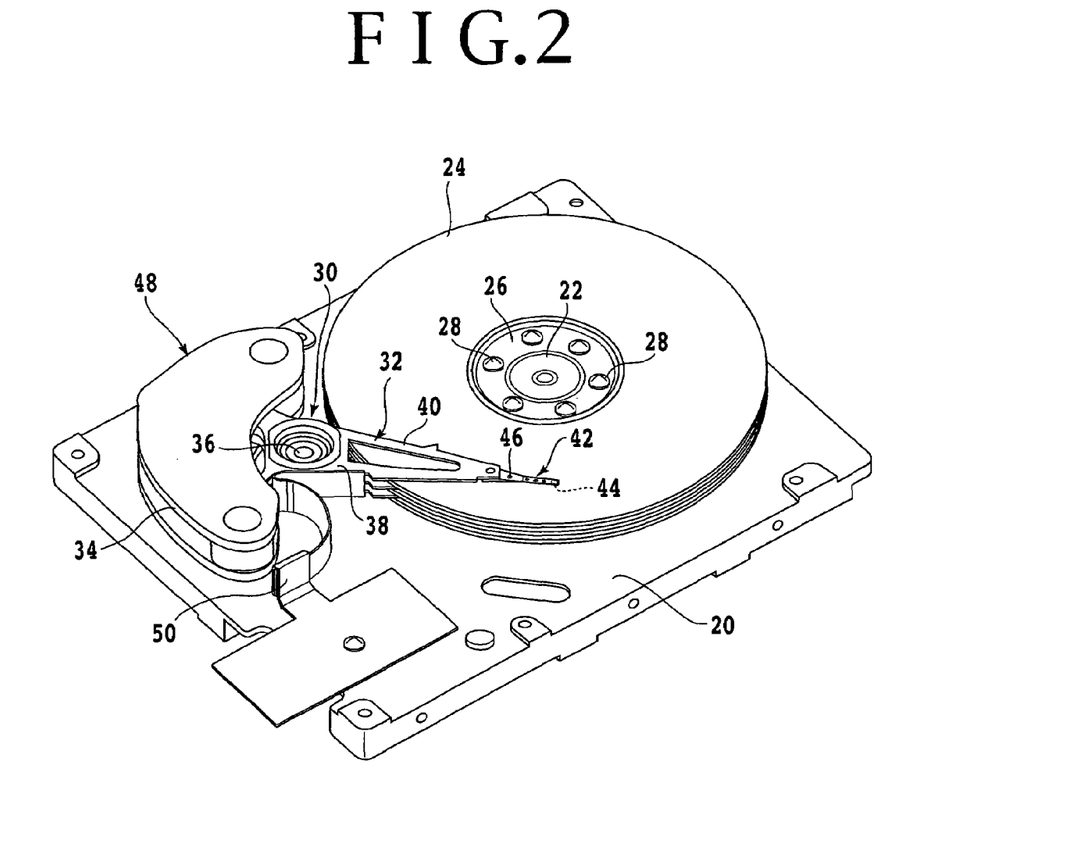
FIG. 2 is a perspective view of a magnetic disk drive in a state wherein a cover is removed.

In the following, several embodiments of the present invention are described with reference to the drawings. In the description of the embodiments, substantially like elements are denoted by like reference characters. Referring to FIG. 2, there is shown a perspective view of a magnetic disk drive of the present invention in a state wherein a cover is removed. A shaft 22 is fixed to a base 20, and a spindle hub not shown which is driven to rotate by a DC motor is provided around the shaft 22. Vertical recording magnetic disks 24 and spacers (not shown) are fitted alternately on the spindle hub. A disk clamp 26 is fastened to the spindle hub by a plurality of screws 28 so that a plurality of magnetic disks 24 are attached in a predetermined spaced relationship from each other to the spindle hub.

Reference numeral 30 denotes a rotary actuator formed from an actuator arm assembly 32 and a magnetic circuit 34. The actuator arm assembly 32 is mounted for pivotal motion around a shaft 36 fixed to the base 20. The actuator arm assembly 32 includes an actuator block 38 mounted for pivotal motion around the shaft 36 through a pair of bearings, a plurality of actuator arms 40 extending in a direction from the actuator block 38, and a head assembly 42 fixed to a tip end of each of the actuator arms 40.

Each of the head assemblies 42 includes a head slider 44 having a vertical recording electromagnetic transducer (magnetic head device) for performing reading/writing of data from/to a magnetic disk 24, and a suspension 46 having a tip end at which the head slider 44 is supported and a base end fixed to the actuator arm 40. A coil not shown is supported on the side opposite to the actuator arms 40 with respect to the shaft 36 and is inserted in the gap of the magnetic circuit 34 to form a voice coil motor (VCM) 48. Reference numeral 50 denotes a flexible printed wiring board (FPC) for supplying a writing signal to the electromagnetic transducers and extracting a reading signal from the electromagnetic transducers. One end of the flexible printed wiring board is fixed to a side face of the actuator block 38, and the other end of the flexible printed wiring board is connected to a main printed wiring board mounted on a rear face of the base 20.

Figure 3:
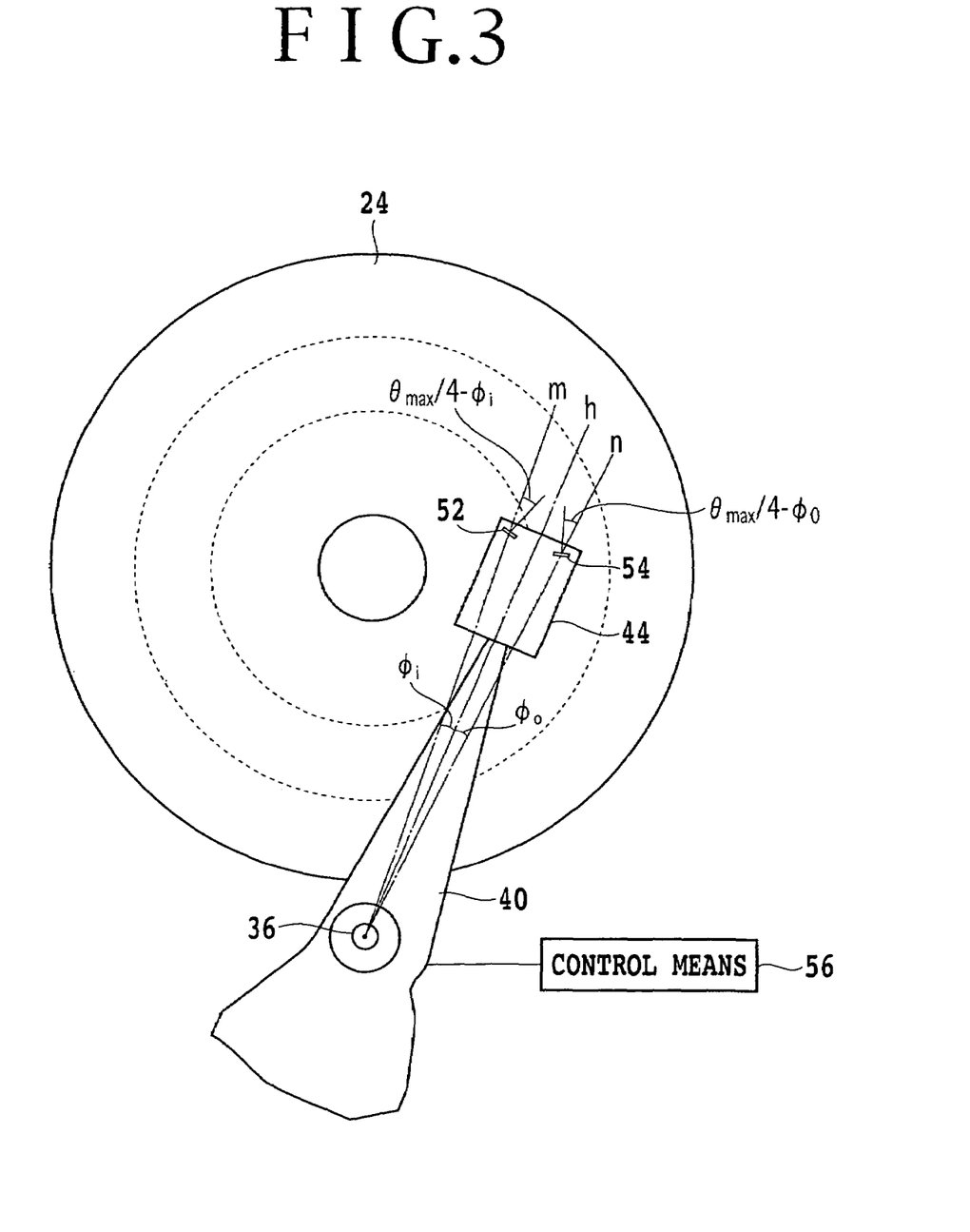
FIG. 3 is a schematic view showing a configuration of a first embodiment of the present invention.

FIG. 3 shows a schematic view showing a configuration of a first embodiment of the present invention. In FIG. 3, the suspension 46 shown in FIG. 2 is omitted, and the head slider 44 is shown carried directly at the tip end of the actuator arm 40. The head slider 44 of the present embodiment includes first and second vertical recording electromagnetic transducers 52 and 54 provided in the proximity of an air outflow end. The first electromagnetic transducer 52 is inclined in a direction in which the inner side face side thereof is nearer to the air outflow end to a central portion thereof, and the second electromagnetic transducer 54 is inclined in a direction in which the outer side face side thereof is nearer to the air outflow end than a central portion thereof.

The maximum yaw angle when the head slider 44 seeks from the innermost track to the outermost track of the magnetic disk 24 having a vertical magnetization film is represented by $\theta_{max}$; the angle defined by a straight line m interconnecting the center of pivotal motion of the actuator arm 40 and the center of the first electromagnetic transducer 52 and a longitudinal center line h of the head slider 44 is represented by $\phi_i$; and the angle defined by a straight line n interconnecting the center of pivotal motion of the actuator arm 40 and the center of the second electromagnetic transducer 54 and the longitudinal center line h of the head slider 44 is represented by $\phi_o$. At this time, the first electromagnetic transducer 52 is formed so as to be inclined by $\theta_{max}/4-\phi_i$ with respect to a perpendicular line to the straight line m interconnecting the center of pivotal motion of the actuator arms 40 and the center of the first electromagnetic transducer 52. The second electromagnetic transducer 54 is formed so as to be inclined by $\theta_{max}/4-\phi_o$ with respect to the perpendicular line to the straight line m interconnecting the center of pivotal motion of the actuator arms 40 and the center of the second electromagnetic transducer 54.

Then, a data region of the magnetic disk 24 is virtually divided at the central portion thereof into two regions, and changeover control is performed by the controlling section 56 so that the inner side data region is taken charge of by the first electromagnetic transducer 52 and the outer side data region is taken charge of by the second electromagnetic transducer 54. By disposing, changing over and using the first and second electromagnetic transducers 52 and 54 in this manner, the oscillation width of the yaw angle can be suppressed to ½, and the influence of protruding recording caused by the yaw angle dependence can be reduced.

Figure 4:
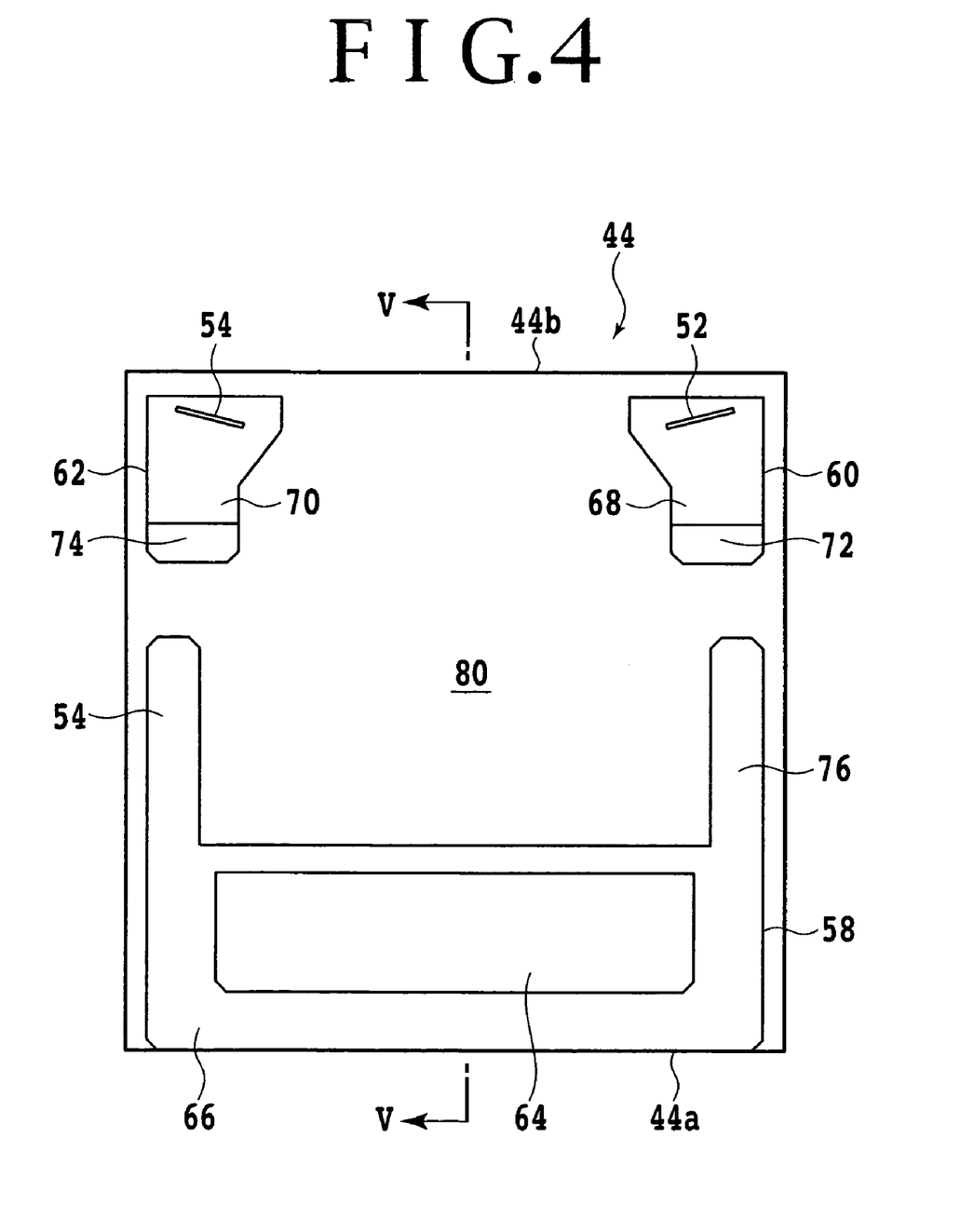
FIG. 4 is a plan view of a head slider of the first embodiment as viewed from the ABS side (flotation face side)
Figure 5:
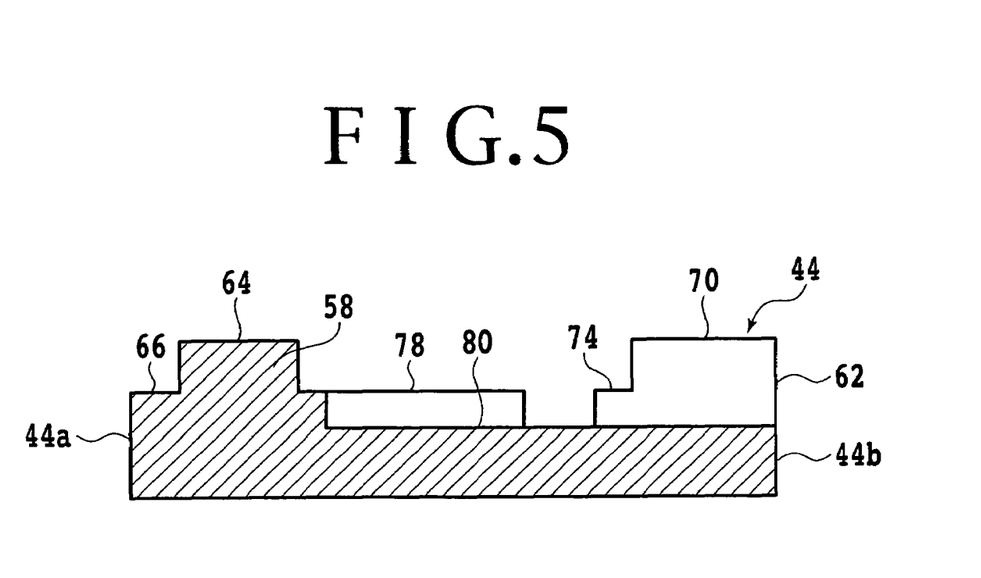
FIG. 5 is a sectional view taken along line V-V of FIG. 4.

FIG. 4 shows a plan view of the head slider 44 as viewed from the ABS side (flotation face side). FIG. 5 is a sectional view taken along line V-V of FIG. 4. The head slider 44 has a rectangular parallelepiped shape and is formed from, for example, $Al_2O_3 \cdot TiC$. The head slider 44 has an air inflow end 44a and an air outflow end 44b. On the disk opposing face of the head slider 44, a front pad 58 is formed adjacent the air inflow end 44a, and a pair of rear pads 60 and 62 are formed adjacent the air outflow end 44b. An uppermost face (air bearing surface) 64 which extends in a slider widthwise direction and a step face 66 having a step with respect to the uppermost face 64 are formed on the front pad 58.

Similarly, uppermost faces (air bearing surfaces) 68 and 70 and step faces 72 and 74 having steps with respect to the uppermost faces 68 and 70 are formed on the rear pads 60 and 62, respectively. The first electromagnetic transducer 52 is formed in the proximity of the air outflow end of the rear pad 60 such that it is inclined at such an angle as described above. Further, the second electromagnetic transducer 54 is formed in the proximity of the air outflow end of the rear pad 62 such that it is inclined at such an angle as described above.

If the magnetic disk 24 rotates and an air flow is generated along a disk face, then the air flow acts upon the uppermost faces 64, 68 and 70. As a result, on the uppermost faces 64, 68 and 70, buoyancy for floating the head slider 44 from the disk face is generated. High buoyancy appears on the uppermost face 64 when the head slider 44 floats above the magnetic disk. As a result, the head slider 44 is retained in a posture inclined by a pitch angle α wherein the air inflow end 44a side is lifted.

A pair of side pads 76 and 78 which extend to the downstream side are continuously formed at both ends in the slider widthwise direction of the front pad 58. A groove 80 is formed on the downstream side of the front pad 58. The groove 80 is formed such that it is started from the inflow end 44a side with respect to the center in a longitudinal direction of the head slider 44 and extends to the outflow end 44b. Accordingly, simultaneously when the air flow which flows along the uppermost face 64 passes the front pad 58, it spreads in the groove 80 in a disk face vertical direction. As a result, a negative pressure is generated in the groove 80. The floating amount of the head slider 44 is specified as the buoyancy described above balances with the negative pressure.

Figure 6:
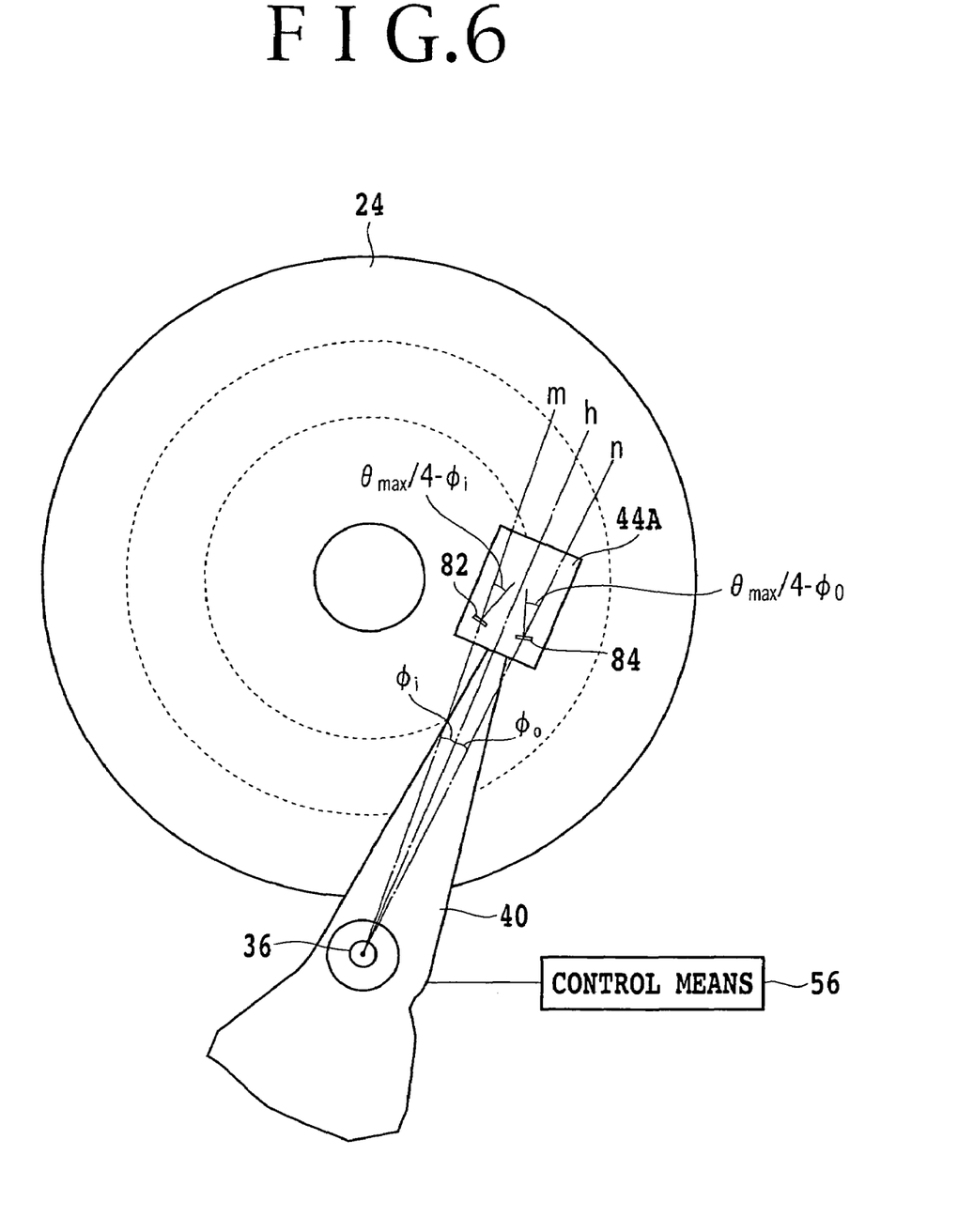
FIG. 6 is a schematic view showing a configuration of a second embodiment of the present invention.

FIG. 6 is a schematic view showing a configuration of a second embodiment of the present invention. In a head slider 44A in the present embodiment, the first and second electromagnetic transducers 82 and 84 are carried in an inclined relationship on the air inflow end side. The inclination angles of the first and second electromagnetic transducers 82 and 84 are similar to those in the first embodiment. Similarly as in the first embodiment, the data region of the magnetic disk 24 is virtually divided at the central portion thereof into two regions, and changeover control is performed by the controlling section 56 such that the inner side data region is taken charge of by the first electromagnetic transducer 82 and the outer side data region is taken charge of by the second electromagnetic transducer 84.

Figure 7:
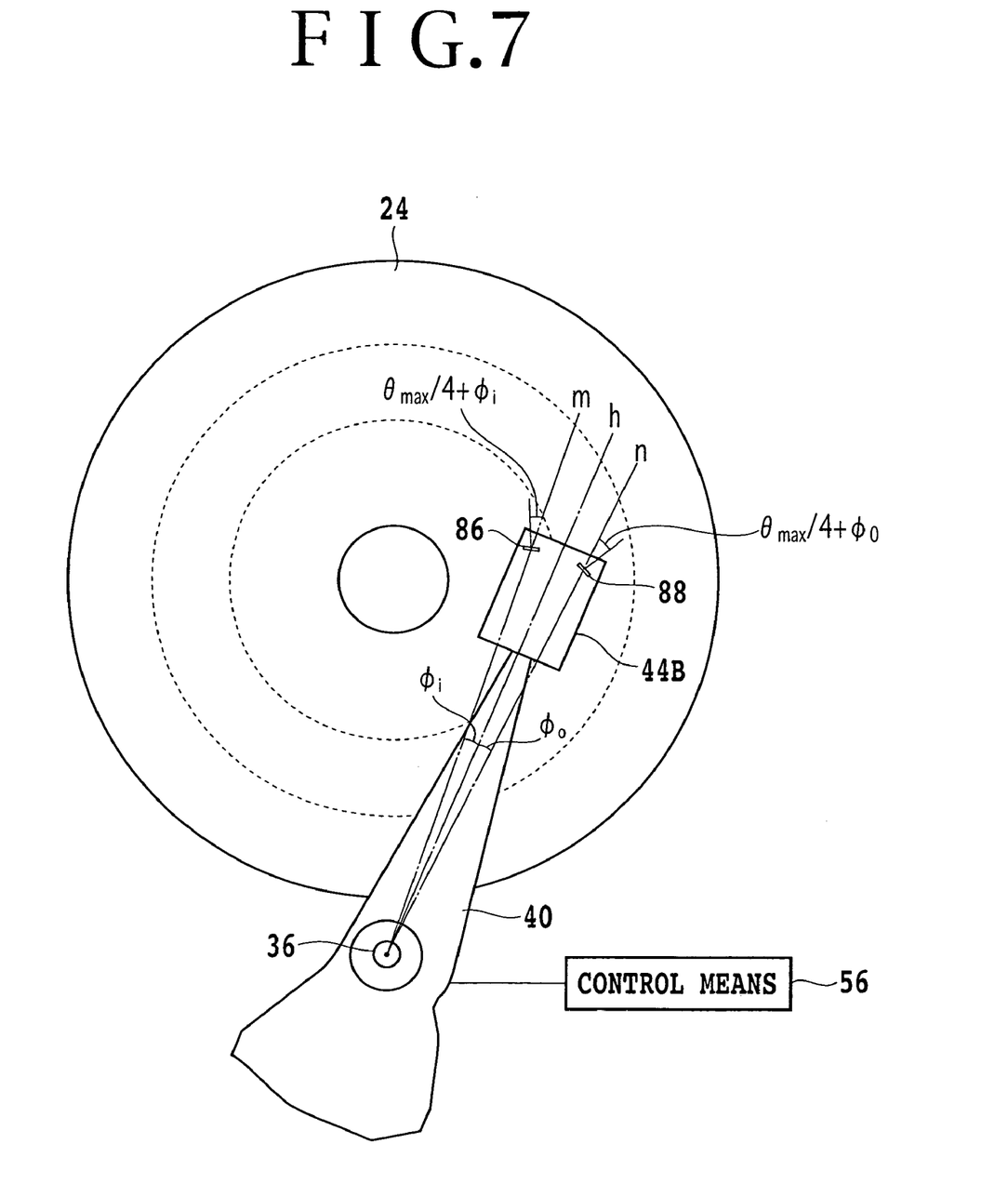
FIG. 7 is a schematic view showing a configuration of a third embodiment of the present invention.

FIG. 7 is a schematic view showing a configuration of a third embodiment of the present invention. A head slider 44B in the present embodiment has first and second electromagnetic transducers 86 and 88 provided in the proximity of the air outflow end inclined in directions opposite to the inclination directions of the first and second electromagnetic transducers 52 and 54 in the first embodiment. In particular, the head slider 44B includes a vertical recording first electromagnetic transducer 86 inclined in a direction in which the inner side face side thereof is farther from the air outflow end from a central portion thereof and a vertical recording second electromagnetic transducer 88 inclined in a direction in which the outer side face side thereof farther from the air outflow end from the central portion thereof.

The maximum yaw angle when the head slider 44B seeks from the innermost track to the outermost track of the magnetic disk 24 having a vertical magnetization film is represented by $\theta_{max}$; the angle defined by a straight line m interconnecting the center of pivotal motion of the actuator arm 40 and the center of the first electromagnetic transducer 86 and a longitudinal direction center line h of the head slider 44B is represented by $\phi_i$; and the angle defined by a straight line n interconnecting the center of pivotal motion of the actuator arm 40 and the center of the second electromagnetic transducer 88 and the longitudinal direction center line h of the head slider 44B is represented by $\phi_o$. At this time, the first electromagnetic transducer 86 is formed so as to be inclined by $\theta_{max}/4+\phi_i$ with respect to a perpendicular line to the straight line m interconnecting the center of pivotal motion of the actuator arm 40 and the center of the first electromagnetic transducer 86. The second electromagnetic transducer 88 is formed so as to be inclined by $\theta_{max}/4+\phi_o$ with respect to a perpendicular line to the straight line n interconnecting the center of pivotal motion of the actuator arm 40 and the center of the second electromagnetic transducer 88.

In the present embodiment, the data region of the magnetic disk 24 is virtually divided at the central portion thereof into two regions, and changeover control is performed by the controlling section 56 such that the inner side data region is taken charge of by the second electromagnetic transducer 88 and the outer side data region is taken charge of by the first electromagnetic transducer 86. In the present embodiment, the divided regions to be taken charge of by the first and second transducers 86 and 88 are reversed to those in the first embodiment. However, since the magnitudes of the angles $\phi_i$ and $\phi_o$ are 10% or less in comparison with the yaw angle, it is considered that the difference between the first and third embodiments is not very great.

Figure 8:
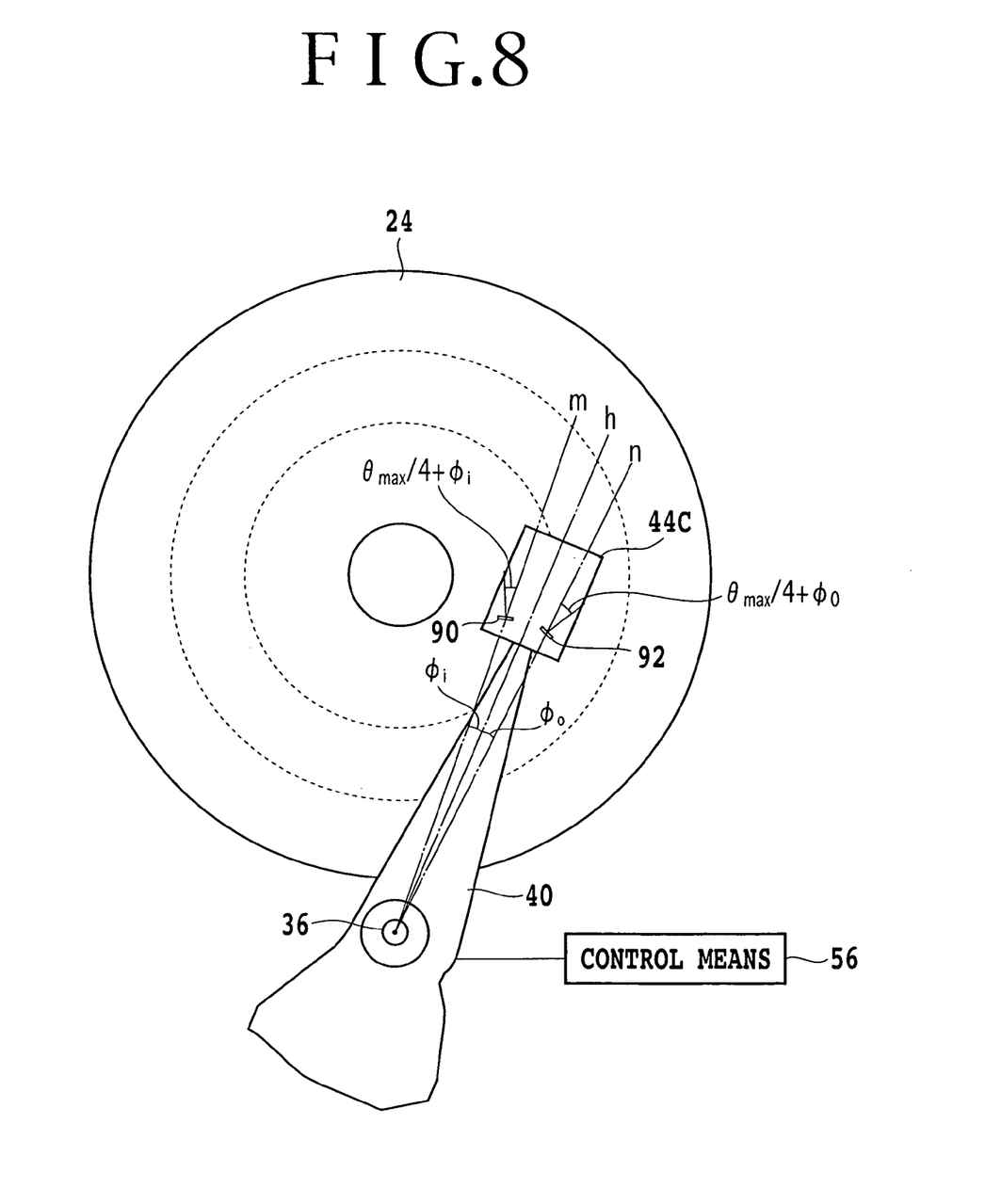
FIG. 8 is a schematic view showing a configuration of a fourth embodiment of the present invention.

FIG. 8 is a schematic view showing a fourth embodiment of the present invention. A head slider 44C in the present embodiment includes first and second electromagnetic transducers 90 and 92 provided in the proximity of the air inflow end and inclined similarly to the electromagnetic transducers 86 and 88 in the third embodiment. The inclination angles of the first and second electromagnetic transducers 90 and 92 are similar to those of the first and second electromagnetic transducers 86 and 88 in the third embodiment. In the present embodiment, the data region of the magnetic disk 24 is virtually divided at the central portion thereof into two regions. Changeover control is performed by the controlling section 56 such that the inner side data region is taken charge of by the second electromagnetic transducer 92 and the outer side data region is taken charge of by the first electromagnetic transducer 90.

Figure 9:
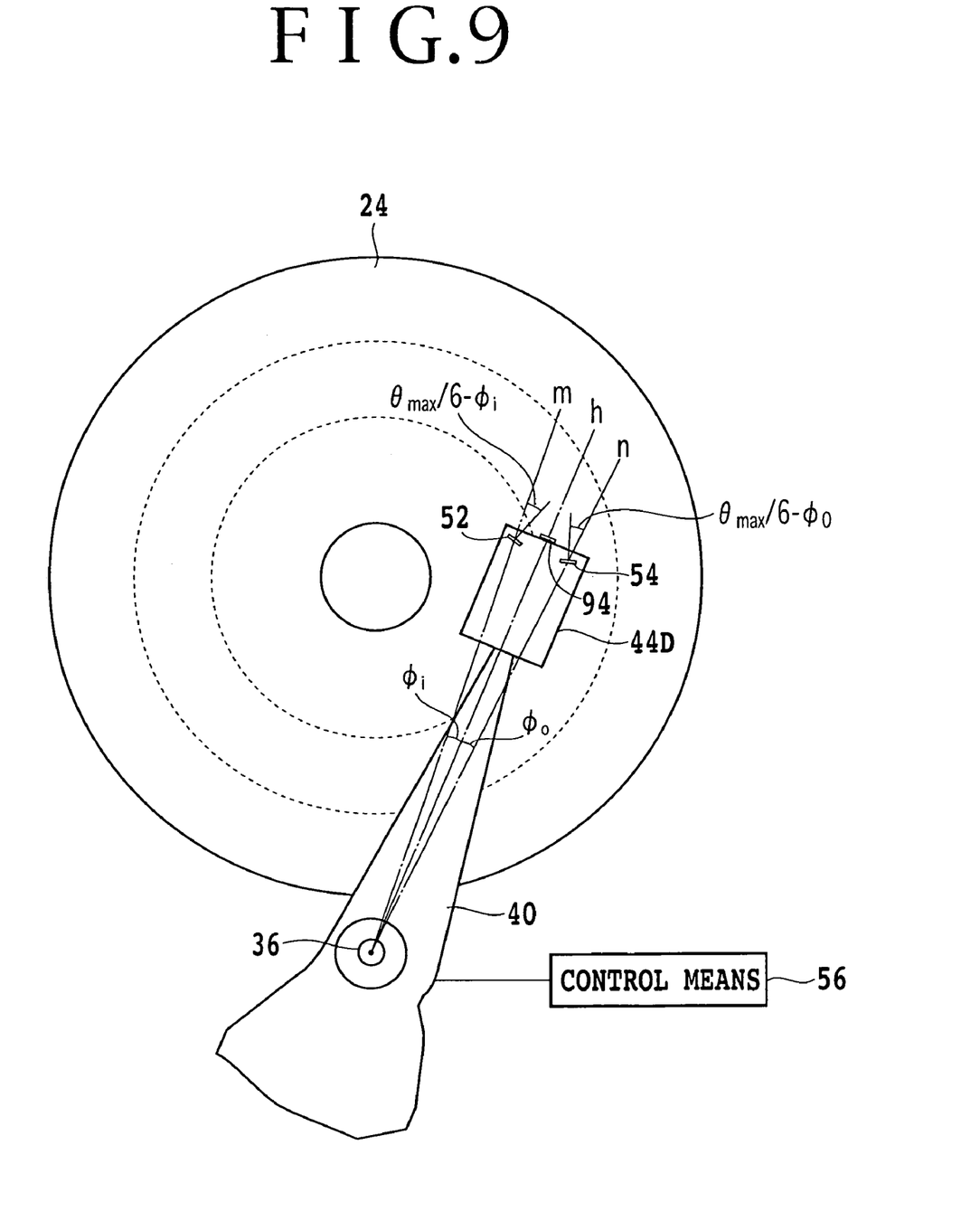
FIG. 9 is a schematic view showing a configuration of a fifth embodiment of the present invention.

FIG. 9 is a schematic view showing a fifth embodiment of the present invention. A head slider 44D in the present embodiment includes vertical recording electromagnetic transducers 52, 54 and 94 in the proximity of the air outflow end. In particular, the head slider 44D includes a first electromagnetic transducer 52 inclined in a direction in which the inner side face side thereof is nearer to the air outflow end than a central portion thereof, a second electromagnetic transducer 54 inclined in a direction in which the outer side face side thereof is nearer to the air outflow end than the central portion, and a third electromagnetic transducer 94 provided in the proximity of the air outflow end at a central portion in the widthwise direction.

The maximum yaw angle when the head slider 44D seeks from the innermost track to the outermost track of the magnetic disk 24 is represented by $\theta_{max}$; the angle defined by a straight line m interconnecting the center of pivotal motion of the actuator arm 40 and the center of the first electromagnetic transducer 52 and a longitudinal direction center line h of the head slider 44D is represented by $\phi_i$; and the angle defined by a straight line n interconnecting the center of pivotal motion of the actuator arm 40 and the center of the second electromagnetic transducer 54 and the longitudinal direction center line h of the head slider 44D is represented by $\phi_o$. At this time, the first electromagnetic transducer 52 is formed so as to be inclined by $\theta_{max}/6-\phi_i$ with respect to a perpendicular line to the straight line m interconnecting the center of pivotal motion of the actuator arm 40 and the center of the first electromagnetic transducer 52, and the second electromagnetic transducer 54 is formed so as to be inclined by $\theta_{max}/6-\phi_o$ with respect to a perpendicular line to the straight line n interconnecting the center of pivotal motion of the actuator arm 40 and the center of the second electromagnetic transducer 54. The third electromagnetic transducer 94 is formed in parallel to the air outflow end in the proximity of the air outflow end at the widthwise direction central portion of the head slider 44D.

Then, the data region of the magnetic disk 24 is virtually divided into three regions. Changeover control is performed by the controlling section 56 such that the inner side data region is taken charge of by the first electromagnetic transducer 52 and the outer side data region is taken charge of by the second electromagnetic transducer 54, and the data region at the central portion is taken charge of by the third electromagnetic transducer 94. Where the electromagnetic transducers 52, 54 and 94 are disposed in this manner and are changed over and used by the controlling section 56, the oscillation width of the yaw angle can be suppressed to ⅓, and the influence of protruding recording by the yaw angle dependence can be decreased.

Figure 10:
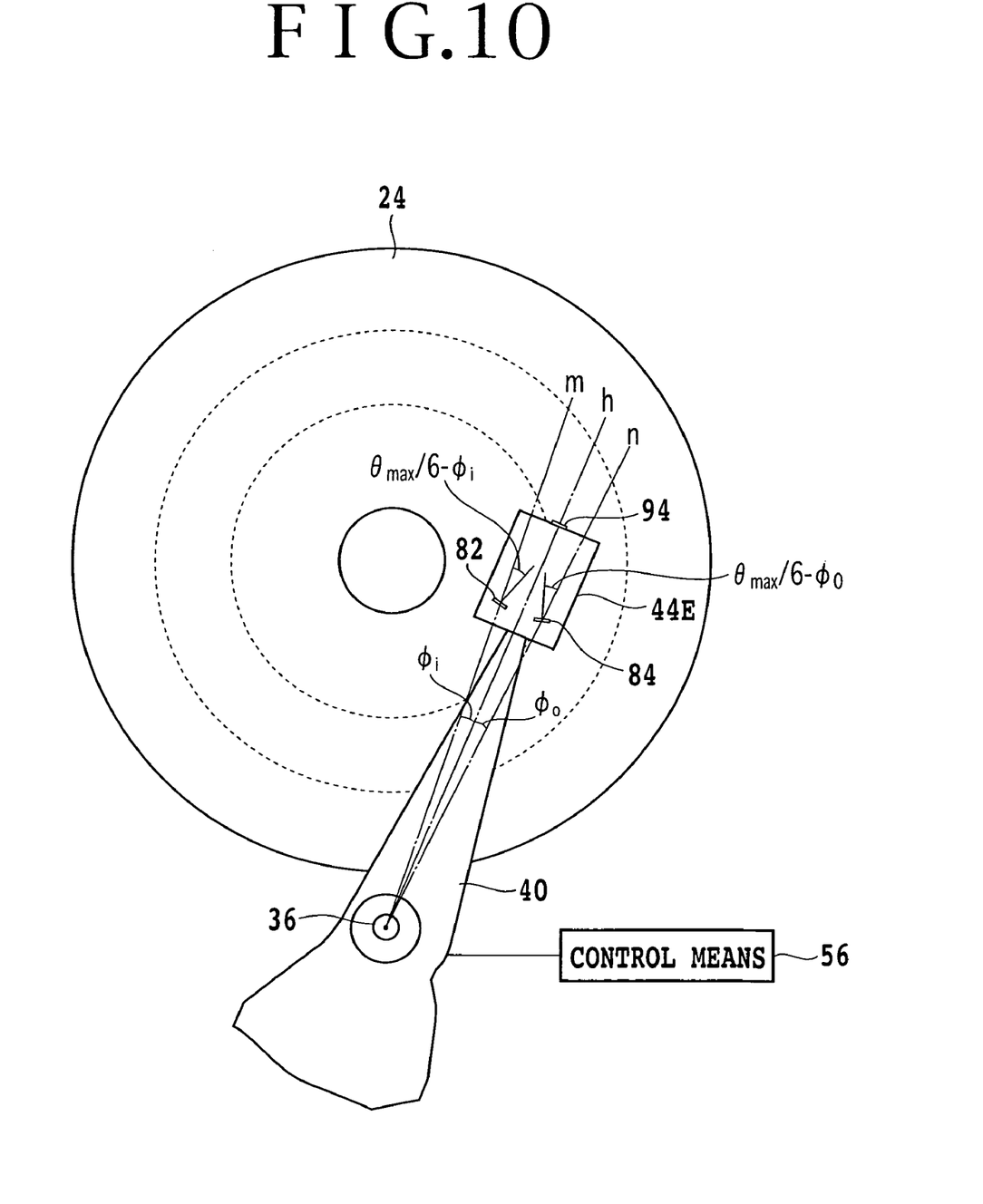
FIG. 10 is a schematic view showing a configuration of a sixth embodiment of the present invention.

FIG. 10 is a schematic view showing a configuration of a sixth embodiment of the present invention. A head slider 44E in the present embodiment includes first and second electromagnetic transducers 82 and 84 provided in the proximity of the air inflow end and inclined similarly to the electromagnetic transducers 52 and 54 in the fifth embodiment shown in FIG. 9, and includes a third electromagnetic transducer 94 in the proximity of the air outflow end at a central portion in the widthwise direction. The inclination angles of the first and second electromagnetic transducers 82 and 84 are similar to those of the first and second transducers 52 and 54 in the fifth embodiment shown in FIG. 9.

Similarly as in the fifth embodiment, the data region of the magnetic disk 24 is virtually divided into three regions. Changeover control is performed by the controlling section 56 such that the inner side data region is taken charge of by the first electromagnetic transducer 82 and the outer side data region is taken charge of by the second electromagnetic transducer 84, and the data region at the central portion is taken charge of by the electromagnetic transducer 94.

Figure 11:
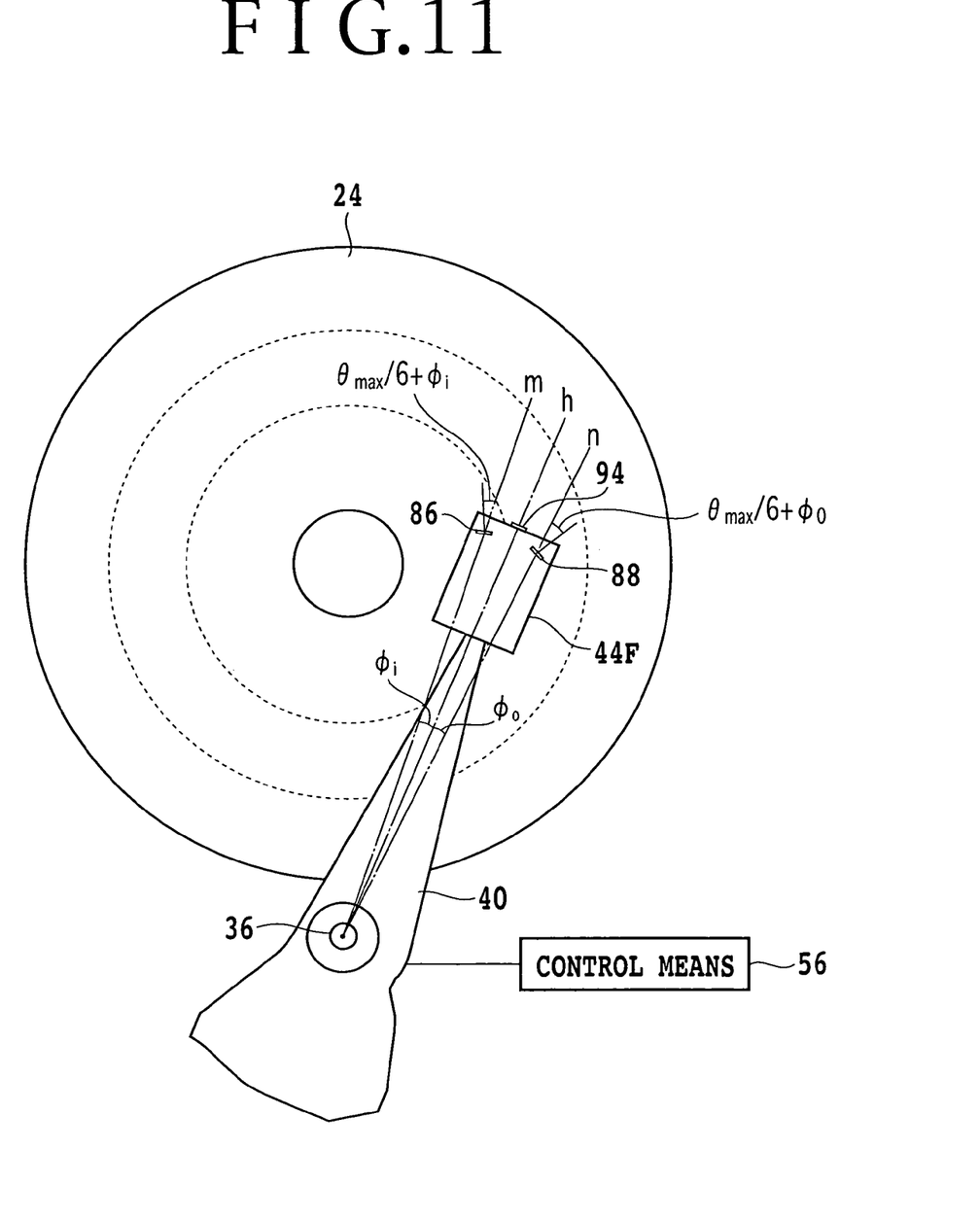
FIG. 11 is a schematic view showing a configuration of a seventh embodiment of the present invention.

FIG. 11 is a schematic view showing a configuration of a seventh embodiment of the present invention. A head slider 44F in the present embodiment includes three vertical recording electromagnetic transducers 86, 88 and 94 in the proximity of the air outflow end. In particular, the head slider 44F includes a first electromagnetic transducer 86 inclined in a direction in which the inner side face side thereof is farther from the air outflow end than a central portion thereof, a second electromagnetic transducer 88 inclined in a direction in which the outer side face side thereof is farther from the air outflow end than the central portion, and a third electromagnetic transducer 94 provided in the proximity of the air outflow end at a widthwise direction central portion of the head slider 44F.

The first electromagnetic transducer 86 is formed so as to be inclined by $\theta_{max}/6+\phi_i$ with respect to a perpendicular line to a straight line m interconnecting the center of pivotal motion of the actuator arm 40 and the center of the first electromagnetic transducer 86. The second electromagnetic transducer 88 is formed so as to be inclined by $\theta_{max}/6+\phi_o$ with respect to a perpendicular line to a straight line n interconnecting the center of pivotal motion of the actuator arm 40 and the center of the second electromagnetic transducer 88. The third electromagnetic transducer 94 is formed in parallel to the air outflow end in the proximity of the air outflow end at the central portion of the head slider 44F.

Then, the data region of the magnetic disk 24 is virtually divided into three regions. Changeover control is performed by the controlling section 56 such that the inner side data region is taken charge of by the second electromagnetic transducer 88 and the outer side data region is taken charge of by the first electromagnetic transducer 86, and the data region of the central portion is taken charge of by the third electromagnetic transducer 94. The regions taken charge of by the first and second electromagnetic transducers 86 and 88 are reverse to those in the fifth embodiment shown in FIG. 9. However, since the magnitudes of the angles $\phi_i$ and $\phi_o$ are 10% or less in comparison with the yaw angle, it is considered that the difference between the fifth and seventh embodiments is not very great.

Figure 12:
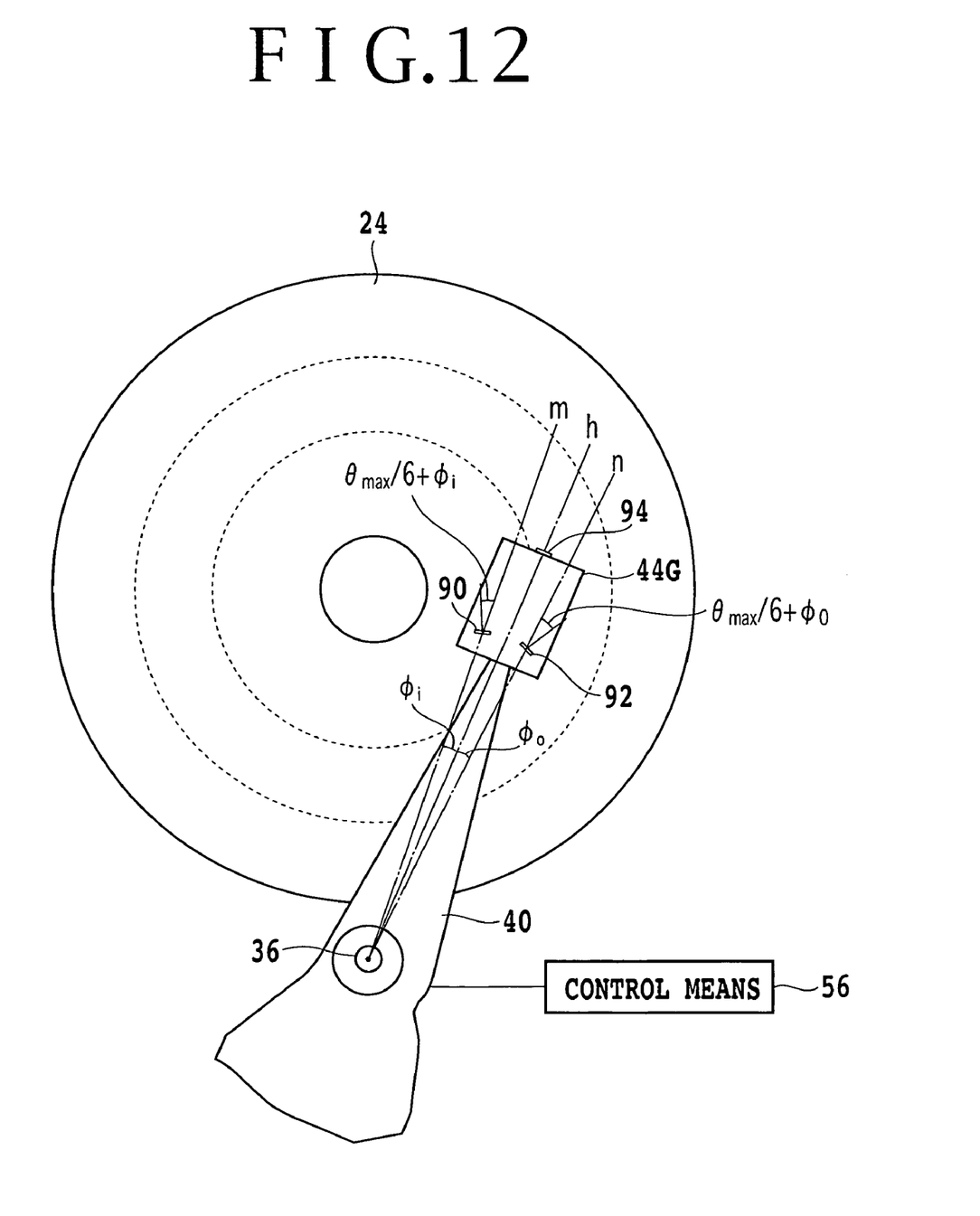
FIG. 12 is a schematic view showing a configuration of an eighth embodiment of the present invention.

FIG. 12 is a schematic view showing a configuration of an eighth embodiment of the present invention. A head slider 44G in the present embodiment includes first and second electromagnetic transducers 90 and 92 provided in the proximity of the air inflow end and inclined similarly to the first and second electromagnetic transducers 86 and 88 in the seventh embodiment shown in FIG. 11, and a third electromagnetic transducer 94 provided in the proximity of the air outflow end at a widthwise direction central portion of the head slider 44G.

Then, the data region of the magnetic disk 24 is virtually divided into three regions, and changeover control is performed by the controlling section 56 such that the inner side data region is taken charge of by the second electromagnetic transducer 92 and the outer side data region is taken charge of by the first electromagnetic transducer 90, and the data region of the central portion is taken charge of by the third electromagnetic transducer 94.

While, in the embodiments described above, the first and second electromagnetic transducers are disposed in an inclined relationship by predetermined angles, since the use track region is known in advance, also the ranges of the yaw angle of the electromagnetic transducers are known. Therefore, the control by the controlling section 56 can be performed by allocating the electromagnetic transducers equally to the regions of the yaw angle in advance and allocating the ranges of the gray code part representative of the head select of firmware and the track position to the electromagnetic transducers.

According to the present invention, the influence of protruding recording caused by yaw angle dependence in a magnetic disk drive which uses a vertical recording method can be reduced by disposing a plurality of vertical recording electromagnetic transducers in an inclined relationship and changing over and controlling the electromagnetic transducer to be used. Since a parallelepiped head slider can be used, the fabrication process of the head slider is almost similar to a conventional fabrication process, and the head slider can be fabricated with a high yield and at a low cost.

What is claimed is:

1. A magnetic disk drive comprising:
   a housing having a base;
   an actuator arm mounted on a pivot for pivotal motion on said base;
   a suspension having a base end fixed to a tip end of said actuator arm;
   a head slider having at least two electromagnetic transducers mounted at a tip end of said suspension, wherein each of the at least two electromagnetic transducers is a recording and reading electromagnetic transducer and the electromagnetic transducers accept writing signals and supply reading signals;

a magnetic disk accommodated for rotation in said housing; and controlling means for performing changeover control between said at least two electromagnetic transducers, wherein said head slider has an air inflow end, an air outflow end, an inner side face, an outer side face, a first electromagnetic transducer having a first end and a second end, the first end being closer to said inner side face than the second end, and a second electromagnetic transducer having a third end and a fourth end, the fourth end being closer to said outer side face than the third end, said first electromagnetic transducer being inclined in a direction in which the first end is closer to said air outflow end than the second end, said second electromagnetic transducer being inclined in a direction in which the fourth end is closer to said air outflow end than the third end, and said controlling means performs the changeover control such that a data region of said magnetic disk is virtually divided at a central portion of said magnetic disk into two regions and the inner side data region is taken charge of by said first electromagnetic transducer while the outer side data region is taken charge of by said second electromagnetic transducer.

2. The magnetic disk drive as set forth in claim 1, wherein, where the maximum yaw angle of said head slider is represented by $\theta_{max}$, an angle defined by a straight line interconnecting the center of pivotal motion of said actuator arm and the center of said first electromagnetic transducer and a longitudinal center line of said bead slider by $\phi_i$, and an angle defined by a straight line interconnecting the center of pivotal motion of said actuator arm and the center of said second electromagnetic transducer and the longitudinal center line of said head slider by $\phi_o$, said first electromagnetic transducer is inclined by $\theta_{max}/4E-\phi_i$ with respect to a perpendicular line to the straight line interconnecting the center of pivotal motion of said actuator arm and the center of said first electromagnetic transducer, and said second electromagnetic transducer is inclined by $\theta_{max}/4E-\phi_o$ with respect to a perpendicular line to the straight line interconnecting the center of pivotal motion of said actuator arm and the center of said second electromagnetic transducer.

3. The magnetic disk drive as set forth in claim 2, wherein said first and second electromagnetic transducers are provided in the proximity of said air outflow end.

4. The magnetic disk drive as set forth in claim 2, wherein said first and second electromagnetic transducers are provided in the proximity of said air inflow end.

5. The magnetic disk drive as set forth in claim 1, wherein each of the electromagnetic transducers is set at a same equal angle to a line joining the pivot to a midpoint of each respective electromagnetic transducer.

6. A magnetic disk drive comprising:

a housing having a base;

an actuator arm mounted on a pivot for pivotal motion on said base;

a suspension having a base end fixed to a tip end of said actuator arm;

a head slider having at least two electromagnetic transducers mounted at a tip end of said suspension, wherein each of the at least two electromagnetic transducers is a recording and reading electromagnetic transducer and the electromagnetic transducers accept writing signals and supply reading signals;

a magnetic disk accommodated for rotation in said housing; and controlling means for performing changeover control between said at least two electromagnetic transducers, wherein said head slider has an air inflow end, an air outflow end, an inner side face, an outer side face, a first electromagnetic transducer having a first end and a second end, the first end being closer to said inner side face than the second end, and a second electromagnetic transducer having a third end and a fourth end, the fourth end being closer to said outer side face than the third end, said first electromagnetic transducer being inclined in a direction in which said second end is closer to said air outflow end than the first end, said second electromagnetic transducer being inclined in a direction in which the third end is closer to said air outflow end than the fourth end, and said controlling means performs the changeover control such that a data region of said magnetic disk is virtually divided at a central portion of said magnetic disk into two regions and the inner side data region is taken charge of by said second electromagnetic transducer while the outer side data region is taken charge of by said first electromagnetic transducer.

7. The magnetic disk drive as set forth in claim 6, wherein, where the maximum yaw angle of said head slider is represented by $\theta_{max}$, an angle defined by a straight line interconnecting the center of pivotal motion of said actuator arm and the center of said first electromagnetic transducer and a longitudinal center line of said head slider by $\phi_i$, and an angle defined by a straight line interconnecting the center of pivotal motion of said actuator arm and the center of said second electromagnetic transducer arid the longitudinal center line of said head slider by $\phi_o$, said first electromagnetic transducer is inclined by $\theta_{max}/4E+\phi_i$ with respect to a perpendicular line to the straight line interconnecting the center of pivotal motion of said actuator arm and the center of said first electromagnetic transducer, and said second electromagnetic transducer is inclined by $\theta_{max}/4E+\phi_o$ with respect to a perpendicular line to the straight line interconnecting the center of pivotal motion of said actuator arm and the center of said second electromagnetic transducer.

8. The magnetic disk drive as set forth in claim 7, wherein said first and second electromagnetic transducers are provided in the proximity of said air outflow end.

9. The magnetic disk drive as set forth in claim 7, wherein said first and second electromagnetic transducers are provided in the proximity of said air inflow end.

10. The magnetic disk drive as set forth in claim 6, wherein each of the electromagnetic transducers is set at a same equal angle to a line joining the pivot to a midpoint of each respective electromagnetic transducer.

11. A magnetic disk drive comprising:

a housing having a base;

an actuator arm mounted on a pivot for pivotal motion on said base;

a suspension having a base end fixed to a tip end of said actuator arm;

a head slider having at least three electromagnetic transducers mounted at a tip end of said suspension, wherein each of the at least three electromagnetic transducers is a recording and reading electromagnetic transducer and the electromagnetic transducers accept writing signals and supply reading signals;

a magnetic disk accommodated for rotation in said housing; and controlling means for performing changeover control among said at least three electromagnetic transducers, wherein said head slider has an air inflow end, an air outflow end, an inner side face, an outer side face, a first electromagnetic transducer having a first end and a second end, the first end being closer to said inner side face than the second end, a second electromagnetic transducer having a third end and a fourth end, the fourth end being closer o said outer side face than the third end, and a third electromagnetic transducer provided in the proximity of said air outflow end, said first electromagnetic transducer being inclined in a direction in which the first end is closer to said air outflow end than the second end, said second electromagnetic transducer being inclined in a direction in which the fourth end is closer to said air outflow end than the third end, and said controlling means performs the changeover control such that a data region is virtually divided into three regions and the inner side data region is taken charge of by said first electromagnetic transducer while the outer side data region is taken charge of by said second electromagnetic transducer and the central data region is taken charge of by said third electromagnetic transducer.

12. The magnetic disk drive as set forth in claim 11, wherein, where the maximum yaw angle of said head slider is represented by $\theta_{max}$, an angle defined by a straight line interconnecting the center of pivotal motion of said actuator arm arid the center of said first electromagnetic transducer and a longitudinal center line of said bead slider by $\phi_i$, and an angle defined by a straight line interconnecting the center of pivotal motion of said actuator arm and the center of said second electromagnetic transducer and the longitudinal center line of said head slider by $\phi_o$, said first electromagnetic transducer is inclined by $\theta_{max}/6E-\phi_i$ with respect to a perpendicular line to the straight line interconnecting the center of pivotal motion of said actuator arm and the center of said first electromagnetic transducer, and said second electromagnetic transducer is inclined by $\theta_{max}/6E-\phi_i$ with respect to a perpendicular line to the straight line interconnecting the center of pivotal motion of said actuator arm and the center of said second electromagnetic transducer.

13. The magnetic disk drive as set forth in claim 12, wherein said first and second electromagnetic transducers are provided in the proximity of said air outflow end.

14. The magnetic disk drive as set forth in claim 12, wherein said first and second electromagnetic transducers are provided in the proximity of said air inflow end.

15. The magnetic disk drive as set forth in claim 11, wherein each of the electromagnetic transducers is set at a same equal angle to a line joining the pivot to a midpoint of each respective electromagnetic transducer.

16. A magnetic disk drive comprising:
a housing having a base;
an actuator arm mounted on a pivot for pivotal motion on said base;
a suspension having a base end fixed to a tip end of said actuator arm;
a head slider having at least three electromagnetic transducers mounted at a tip end of said suspension, wherein each of the at least three electromagnetic transducers is a recording and reading electromagnetic transducer and the electromagnetic transducers accept writing signals and supply reading signals;
a magnetic disk accommodated for rotation in said housing; and
controlling means for performing changeover control among said at least three electromagnetic transducers, wherein said bead slider has an air inflow end, an air outflow end, an inner side face, an outer side face, a first electromagnetic transducer having a first end and a second end, the first end being closer to said inner side face than the second end, and a second electromagnetic transducer having a third end and a fourth end, the fourth end being closer to said outer side face than the third end, and a third electromagnetic transducer provided in the proximity of said air outflow end, said first electromagnetic transducer being inclined in a direction in which the second end is closer to said air outflow end than the first end, said second electromagnetic transducer being inclined in a direction in which the third end being closer to said air outflow end than the fourth end, and said controlling means performs the changeover control such that a data region is virtually divided into three regions and the inner side data region is taken charge of by said second electromagnetic transducer while the outer side data region is taken charge of by said first electromagnetic transducer and the central data region is taken charge of by said third electromagnetic transducer.

17. The magnetic disk drive as set forth in claim 16, wherein, where the maximum yaw angle of said head slider is represented by $\theta_{max}$, an angle defined by a straight line interconnecting the center of pivotal motion of said actuator aim and the center of said first electromagnetic transducer and a longitudinal center line of said head slider by $\phi_i$, and an angle defined by a straight line interconnecting the center of said actuator arm and the center of said second electromagnetic transducer arid the longitudinal center line of said head slider by $\phi_o$, said first electromagnetic transducer is inclined by $\theta_{max}/6E+\phi_i$ with respect to a perpendicular line to the straight line interconnecting the center of pivotal motion of said actuator arm and the center of said first electromagnetic transducer, and said second electromagnetic transducer is inclined by $\theta_{max}/6+\phi_o$ with respect to a perpendicular line to the straight line interconnecting the center of pivotal motion of said actuator arm and the center of said second electromagnetic transducer.

18. The magnetic disk drive as set forth in claim 17, wherein said first and second electromagnetic transducers are provided in the proximity of said air outflow end.

19. The magnetic disk drive as set forth in claim 17, wherein said first and second electromagnetic transducers are provided in the proximity of said air inflow end.

20. The magnetic disk drive as set forth in claim 16, wherein each of the electromagnetic transducers is set at a same equal angle to a line joining the pivot to a midpoint of each respective electromagnetic transducer.

* * * * *